United States Patent [19]

Burnham

[11] 4,230,995
[45] Oct. 28, 1980

[54] ELECTRICALLY EXCITED MERCURY HALIDE LASER

[75] Inventor: Ralph L. Burnham, Washington, D.C.

[73] Assignee: The United States of America as represented by the Secretary of the Navy, Washington, D.C.

[21] Appl. No.: 954,377

[22] Filed: Oct. 24, 1978

[51] Int. Cl.³ .............................................. H01S 3/223
[52] U.S. Cl. .............................................. 331/94.5 G
[58] Field of Search .................... 331/94.5 G, 94.5 DE

[56] References Cited

U.S. PATENT DOCUMENTS 4,168,475  9/1979  Schimitschek et al. ........ 331/94.5 G

OTHER PUBLICATIONS

"Mercuric Bromide Photodissociation Laser"; by E. J. Schimitschek et al.; *Applied Physics Letters*, vol. 31, No. 9, pp. 608–610, Nov. 1977.

"Mercuric Bromide Dissociation Laser in an Electric Discharge"; by E. J. Schimitschek et al.; *Optics Letters*, vol. 2, No. 3, pp. 64–66; Mar. 1978.

*Primary Examiner*—William L. Sikes
*Assistant Examiner*—Leon Scott, Jr.
*Attorney, Agent, or Firm*—R. S. Sciascia; Philip Schneider; Melvin L. Crane

[57] ABSTRACT

An improved electric-discharge-excited mercury halide dissociation laser operable on the (B-X) transitions in HgCl, HgBr and HgI at 558, 502 and 443 nm respectively. The laser discharge cell is elongated and made from temperature-resistant silicon-glass laminate or any other suitable material and includes separate ceramic crucibles for containing mercuric dihalide crystals. A pair of electrodes, each having external terminals, extend along the linear axis of the cell in parallel relationship with the linear axis and each other. Ultraviolet discharge means is also provided for preionizing a buffer gas of helium to which nitrogen has been added. The improvement comprises the addition of about 10% nitrogen to the buffer gas of helium which is admitted to the laser cell prior to excitation. The addition of nitrogen may act to selectively remove the terminal levels of the mercury halide laser transitions, thereby permitting more efficient extraction of the optical energy from the laser media. Thus improvements in both efficiency and output energy are obtained. The laser cavity is completed by a fully and a partially reflective surface for the wavelength of operation. The gases are preionized and excited by pulsed electrical energy from separate sources.

7 Claims, 3 Drawing Figures

ELECTRICALLY EXCITED MERCURY HALIDE LASER

REFERENCE TO ANOTHER APPLICATION

This invention is an improvement over application, Ser. No. 874,434, filed Feb. 2, 1978, by Erhard J. Schimitschek and John R. Celto, now U.S. Pat. No. 4,168,475 which has been assigned to The United States of America as represented by the Secretary of the Navy, Washington, D.C.

BACKGROUND OF THE INVENTION

This invention relates to mercuric halide lasers and more particularly to a dissociation laser in HgCl, HgBr, and HgI which is excited by preionized gases containing nitrogen with a subsequent transverse electric discharge.

Heretofore mercuric halide gas vapor lasers have been excited by high-intensity electron beams. Such systems have been set forth in the following published articles: (1) "Laser Action on the $B^2\Sigma+\frac{1}{2}\rightarrow X^2\Sigma+\frac{1}{2}$ Band of HgCl at 5576 A," by J. H. Parks, Applied Physics Letters, Vol. 31, No. 3, pp. 192–194, 1 Aug. 1977. (2) "Laser Action on the $B^2\Sigma+\frac{1}{2}\rightarrow X^2\Sigma+\frac{1}{2}$ Band of HgBr at 5018 Å", by J. H. Parks, Applied Physics Letters, Vol. 31, No. 4, pp 287–290, 15 Aug. 1977. (3) "Green HgCl ($B^2\Sigma+\rightarrow X^2\Sigma+$) Lasers", by J. Gary Eden, Applied Physics Letters Vol. 31, No. 7, pp 448–450, 1 Oct. 1977.

Another laser system has been used in which laser action on the $B^2\Sigma+\rightarrow X^2\Sigma+$ transition was achieved by photo-dissociating $HgBr_2$ in the vapor phase by use of an ArF excimer laser. High efficiency of laser action was limited by the pump efficiency. Such a laser system has been set forth in an article, "Mercuric Bromide Photodissociation laser", by E. J. Schimitschek, J. E. Celto and J. A. Trias, Applied Physics Letters, Vol. 31, No. 9, pp 608–610, 1 Nov. 1977.

SUMMARY OF THE INVENTION

In the present invention, mercuric halide dissociation lasers are excited by an electric discharge and operate in electronic transitions in the mercurous halide radical (HgCl, HgBr and HgI) through the addition of nitrogen gas. Nitrogen gas is added from 5% to 15% of a buffer gas of hydrogen. The gases are UV-preionized prior to the electric discharge and the addition of nitrogen to the buffer gas allows greatly increased laser output energy from the same active laser volume as well as greatly improved efficiency of the laser. The addition of nitrogen to the laser cell makes possible laser oscillation in HgI at 444 nm for the first time. In operation, the laser cell is placed within an oven and maintained at a temperature of from 135° C. to 180° C. At these temperatures, the vapor pressure of mercury or mercuric halide is between 1 and 10 Torr which is optimum for operation of the laser. Further, optimum laser performance is obtained using a mixture of 10%$N_2$ in helium at about 1000 Torr total pressure. With the addition of 10% nitrogen, the output increased by an order-of-magnitude.

DETAILED DESCRIPTION

Figure 1:
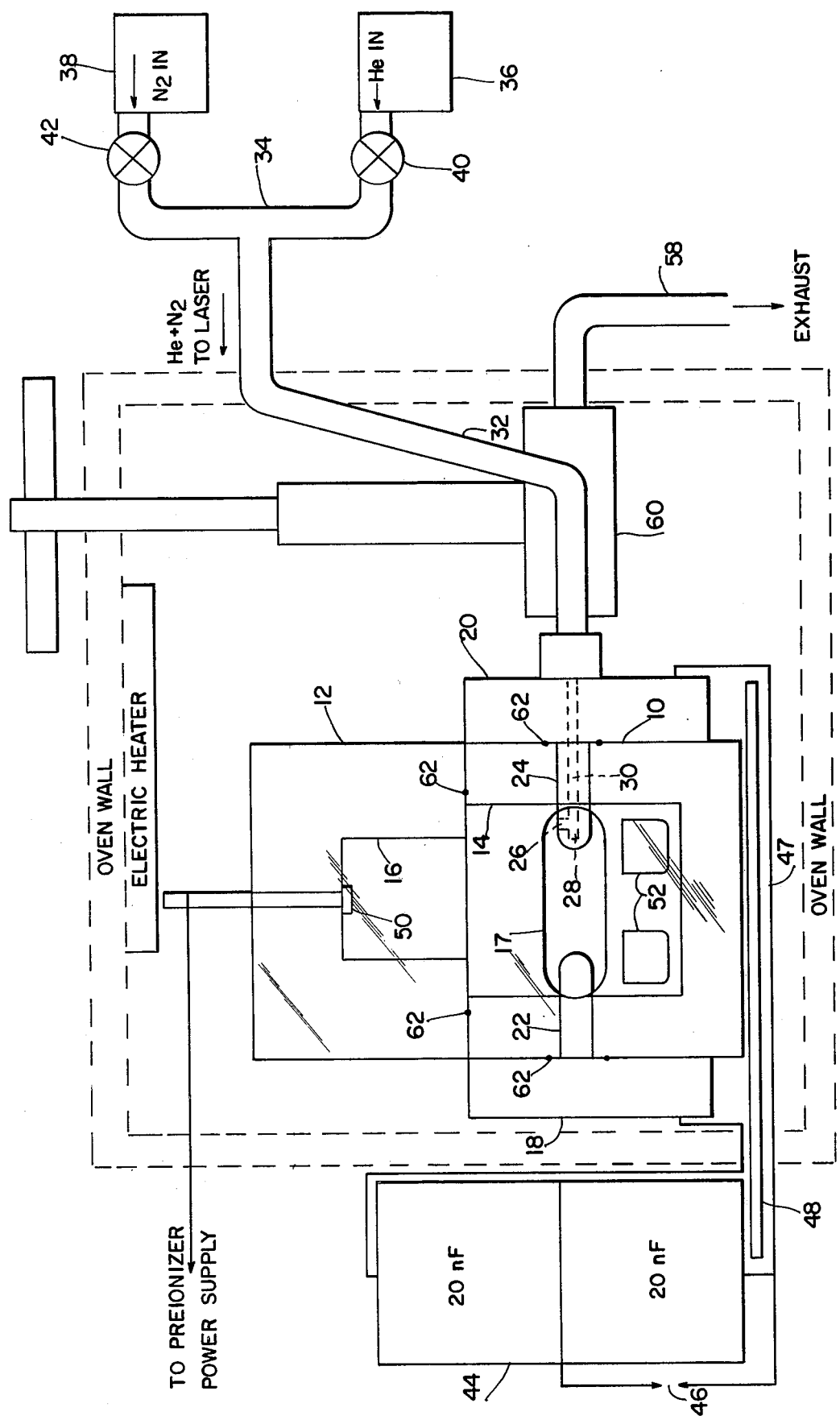
FIG. 1 shows the overall laser system illustrating the relative parts.

FIG. 1 illustrates a two-section (10 and 12) laser discharge cell made from temperature-resistant silicon-glass laminate or any other suitable material which is resistant to reaction gases, such as the halogen bearing compounds, and which will maintain its strength at temperatures up to 250° C. Each of the cell sections are cut out to form rectangular cavities 14 and 16, cavity 14 having a greater width than cavity 16, as shown. The two sections are placed together such that their cavities face each other to form a single cavity. The laser cell is closed at each end by suitable windows 17 such as quartz placed at Brewster's angle to facilitate extraction of the energy.

Electrical conductors 18 and 20 extend along the length of the housing and are provided with elongated electrodes 22 and 24 which extend into the cavity 14 from opposite sides of the cavity parallel with each other and parallel with the principle axis of the laser cell. The electrodes are semicircular on their ends within the laser cell, as shown. Electrode 24 is made with a plurality of orifices 26 spaced along the length thereof within the cavity 14. The orifices extend to a linear passage 28 that extends substantially the length of the electrode(transverse to the plane of FIG. 1). A passage 30 extends perpendicularly to passage 28 out through the conductor 20. The orifice passage arrangement is similar to a maniford. A stainless steel tube 32 connects with conductor 20 at passage 30 and admits a gas or gaseous mixture into the cavity. The stainless steel tube 32 connects with a "tee-tube" 34 which connects at one end with a helium supply 26 and at the opposite end to a nitrogen supply 38. The "tee-tube" is provided with control valves 40 and 42 for admitting nitrogen and helium gas into the laser cell.

The electrical conductors 18 and 20 are connected with a pulsed electrical energy from two 20 nF (nanoFarad) capacitors 44 each of which supplies energy to the cell when triggered by a spark gap switch 46. The electrical energy is discharged through a low-inductance connection 47, insulated by a pressed mica insulator 48.

Laser-cell section 12 is provided with an ultraviolet-producing means for preionizing the gaseous mixture. The system shown is formed by a plurality of aligned metal washers 50 secured to the glass laminate section by screws. The washers are spaced about 0.254 cm along the length of the upper section. The first washer at one end is secured to a highvoltage power supply and the last washer at the opposite end is connected to ground. Application of the high voltage to the washers produces sparks between the washers which produces ultraviolet radiation. A well-known flashboard may be used for like results. The high voltage source is pulsed ON prior to the main discharge in order to preionize the gaseous mixture. A pulsed power supply and preionizing circuit similar to the one used herein is shown in an article "Mercuric Bromide Dissociation Laser in an Electric Discharge", by E. H. Schimitshek and J. E. Celto, Optics Letters, Vol. 2, No. 3, pp 64–66, March 1978. A pair of spaced elongated ceramic crucibles 52 are placed beneath the electrodes and extend along the length of the electrodes within the laser cell. In carrying out the invention, mercuric dihalide crystals such as $HgCl_2$, $HgBr_2$, or $HgI_2$ are placed in the crubibles beneath the elongated electrodes in the cell.

The laser cavity is completed by use of reflective surfaces 54, 56 each of which have a two-meter radius of curvature, one of which is 99% reflective and the other 80%-90% reflective at the operating wavelength. The reflective surfaces are spaced from the end of the laser cell. With a laser cell having a length of 55 cm, the reflective surfaces have a spacing 60 cm from each other. Subsequent to discharge, the discharged gases are pumped out through a stainless-steel tube 58 which connects with laser-cell section 10. A stainless-steel valve 60 is placed in the discharge tube to open and close the discharge line. The discharge tube may be connected to a vacuum pump which is used to evacuate the system prior to admitting any gases into the laser cell and to exhaust the gases subsequent to lasing. The laser cell is placed in an oven shown in dotted line in FIG. 1. The oven is heated to vaporize the mercuric dihalide and to maintain the laser cell at a desired temperature of from about 135° to about 180° C. At these temperatures the vapor pressure of the mercury or the mercuric dihalide is between 1 and 10 Torr which has been determined to be an optimum vapor pressure for operation of the laser. The laser cell electrodes 18 and 20, the connection with electrode 50, a portion of the steel, gas inlet tube 32, the control valve 60, and a portion of exhaust tube 58 are contained within the housing so that they will be at the same temperature as that of the laser cell during operation.

Figure 2:
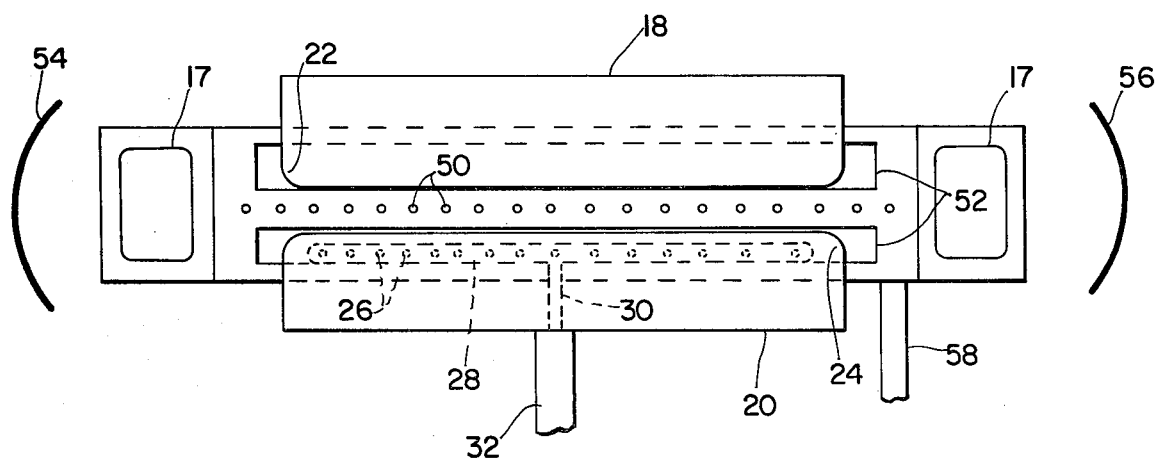
FIG. 2 is a top view of the laser cell with the reflective surfaces.
Figure 3:
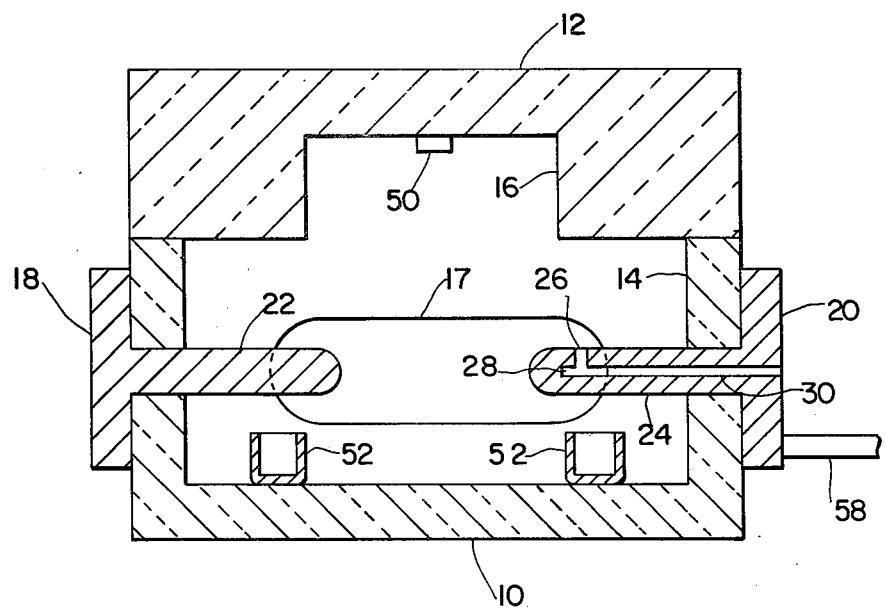
FIG. 3 is a cross-sectional view across the laser cell.

FIGS. 2 and 3 have been included to better illustrate the laser cell and the relationship of the different elements. The reference characters represent parts corresponding to those shown in FIG. 1.

In operation, the upper section 16 of the laser cell is removed and the mercuric dihalide crystals are placed within the ceramic crucibles in the laser cell. The upper section 16 is then replaced and secured in place. The system is evacuated to a vacuum pressure of 0.1 Torr and then heated to a temperature of from 135° C. to 180° C. The heat vaporizes the mercuric dihalide to fill the laser cell with mercuric halide vapor at a pressure of from 1 to 10 Torr. A mixture of nitrogen and helium gas (from 5-15% nitrogen) is admitted into the laser cell through tube 32, passage 30, and orifices 26 to mix with the mercuric halide vapor in the laser cell to obtain a total pressure of about 1000 Torr. For optimum laser performance it has been determined that the helium-nitrogen gaseous mixture should contain 10% nitrogen. The gaseous mixture is preionized by a preionizing discharge through electrodes 50. The discharge being pulsed ON prior to the main discharge to produce ultra-violet radiation which ionizes the gases. After the gases have been preionized, the main circuit is discharged through the trigger switch. The main discharge excites the gaseous mixture and operates on the (B-X) transitions of the mercury monohalides in the blue and green spectral regions whose upper laser levels are produced through dissociative excitation of the parent mercuric halide molecules. Nitrogen acts to selectively remove the terminal levels of the mercury halide laser transitions, thereby permitting more efficient extraction of optical energy from the laser media. The exhaust valve is opened to exhaust the gases subsequent to excitation.

In carrying out the invention the laser cell should be made of a material which does not react to the gaseous reaction and the heat used. For mercuric dihalide, a laser cell made of G-7 silicon-fiberglass laminate can be used. The electrodes may be made of aluminum coated with nickel, each having a 6 mm wide-radius profile, and are 50 cm in length with their opposing ends separated by 2 cm. The laser-cell sections are such that the preionizer electrodes are spaced 4 cm from the plane of the discharge between the main electrodes. The oven is operated at from 135° C. to 180° C. depending on the mercuric dihalide used; 135° C.-140° C. for $HgCl_2$ and HgBr, and 180° C. for $HgI_2$. The laser cell is just longer than the electrodes, has a total active volume of 50 cm$^3$ and the walls should be sufficiently thick to withstand the internal pressures of operation. The connected parts are prevented from leaking by the use of appropriate seals such as O-rings 62 where necessary.

Heretofore, visible emission spectra has been obtained from the discharge-pumped mercuric halides ($HgX_2$) with helium dominated by the (B-X) systems of the mercury halides. A dramatic improvement of the output energy from each of the mercury halide lasers has been obtained by the addition of nitrogen to the gaseous mixture. Without nitrogen, the maximum energy which could be extracted from the HgCl and HgBr lasers is about 100 $\mu$J, while the HgI laser could barely be brought above threshold in a high-Q optical cavity. With as little as 10 Torr of nitrogen added to the helium buffer gas at a total pressure of 750 Torr, the output from each of the mercury halide lasers increased by nearly an order-of-magnitude. Laser energy continues to increase with increasing partial pressure of nitrogen up to approximately 100 Torr at which point arcing in the discharge causes a decrease in the output power.

The maximum energies obtained from the mercury halide lasers with the addition of nitrogen to the gaseous mixture were 3.0 mJ from HgCl, 7.5 mJ from HgBr, and 0.3 mJ from HgI. These energies were obtained with an optimum nitrogen admixture of 10% in helium at a total pressure of 1000 Torr and at a discharge cell temperature corresponding to a vapor pressure of $HgX_2$ of about 10 Torr. The maximum energy from each of the lasers was extracted using an optical cavity having about 20% output coupling. Without nitrogen, the optimum output coupling was between 1 and 2%.

A notable increase in laser energy upon addition of nitrogen suggest the possibility of direct pumping of the HgX(B) state through collisional transfer from electronically excited nitrogen. However, the intensity of the (B-X) fluorescence shows little on no increase upon the addition of up to 100 Torr of nitrogen to the discharge. Fluorescence from the (B-X) bands actually decreases somewhat with nitrogen pressure near 100 Torr indicating collisional quenching of the HgX(B) state. The explanation of the improved mercury halide laser performance in terms of direct collisional pumping of the (B) states by excited nitrogen therefore seems unlikely.

Efficient extraction of energy from the (B-X) inversion in the mercury halides requires the rapid relaxation of the vibrational manifolds in both the excited and terminal laser states. In the upper state, fast relaxation to $v'=0$ is necessary inorder for the removal of the population through stimulated emission in the strongest laser lines to dominate collisional and radiative loss from higher vibrational levels. In the lower, (X), state, the rate of relaxation of the high vibrational levels on which the laser terminates ($v''\simeq 20$) must be much greater than the transition probability from the upper to the lower state in order to prevent bottlenecking and loss in laser efficiency. Systems with photolytically pumped mercury halide lasers have shown that nitrogen and the rare gases have roughly equal efficiency for relaxation of the upper and lower state vibrational manifolds.

It is therefore not expected that the presence of unexcited nitrogen in the discharge lasers should have a large effect on the laser extraction efficiency. However, in the pulsed transverse discharge, the vibrational temperature of nitrogen is likely to be quite high, such that a large fraction of the nitrogen may be vibrationally excited (25% at 2000° K.). The vibrationally excited nitrogen is believed to be very effective for removing the terminal levels of the mercury halide lasers through collisional dissociation of the vibrationally excited mercury halides in the weakly bound ground state. The process:

$$HgX(v'') + N_2(v=1) \rightarrow Hg + X + N_2(v=0) \quad (1)$$

is exothermic by 1175 cm$^{-1}$ for HgI(v=15); 24 cm$^{-1}$ for HgBr(v''=22); and endothermic by 600 cm$^{-1}$ for HgCl(v''=22). It may be possible therefore for reaction (1) to provide a removal rate for HgX(v'') which is several times the decay rate of the upper laser level (e.g. as large as $3 \times 10^8$/sec-molec. for [N(v=1]$\simeq$25 Torr). The kinetic processes occurring in the mercury halide-heliumnitrogen discharges is not fully understood at this time.

The results of the present mercuric dihalide laser systems are summarized in Table I.

TABLE I

| Laser | Wavelength (nm) | Excitation Efficiency | Laser Energy (mJ) | Net Laser Efficiency |
|---|---|---|---|---|
| HgCl | 552,555 558,559 | 0.3% | 3.0 | 0.05% |
| HgBr | 502,504 | 0.5% | 7.5 | 0.1% |
| HgI | 443,444 | 0.3% | 0.3 | 0.005% |

It may be seen that the production efficienceis for the (B-X) flourescence from each of the mercury halides in the discharge are comparable. The overall efficiencies of the lasers however, varies from about 0.1% for HgBr to 0.005% for HgI. The relatively poor efficiency of the HgI lasers is believed to arise from a large thermal population of the terminal laser levels in HgI which lie only ~5 kT above the v''=0 level of the ground state. At the temperature of the discharge as much as 1% of the total HgI population may reside in the v''=15 level, thereby reducing the inversion density (N(B)N(X)), and consequently the laser gain and extraction efficiency. The extraction efficiencies of 10 to 20% for HgCl and HgBr seem quite reasonable considering the time necessary for the buildup of laser oscillation (~20 ns) and the probable existence of optical absorption in the laser medium. Some further improvement in the extraction and the excitation efficiencies are likely as the operation of the discharge-pumped mercuric halide dissociation laser becomes better understood. These lasers may then be scalable to pulse energies of several hundred mJ at efficiencies near 1%.

The laser cell has been described as including two ceramic crucibles within which mercuric dihalide crystals are placed. The laser may be operated by replacing the mercuric dihalide crystals in the crucibles by metallic liquid mercury and then introducing a halogen donor gas by mixing this gas with the nitrogen-helium gaseous mixture. Halogen donor gas such as $Cl_2$, $Br_2$, HCl, or any of a number of halogenated hydrocarbons may be added. The addition of nitrogen in this system also improves the efficiency of operation as set forth above.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In an improved, pulsed, wavelength-tunable laser producing emitted laser energy by electron-impact dissociation of metal dihalides and their cyclic recombination comprising a sealed enclosure including end windows at Brewster's angle, first and second elongated electrodes supported in parallel-spaced relationship within said enclosure along the principle axis of said enclosure with external electrical terminals connected with said electrodes, means within said enclosure extending along the length of said electrodes for supporting a metal dihalide therein, means for adding a buffer gas of helium into said sealed enclosure, electrode means within said sealed enclosure for preionizing the gases within said sealed enclosure, a fully and partially reflective surface in alignment with the principle axis of said sealed enclosure for producing optical resonance of the emitted laser energy, and a heat source for vaporizing and maintaining said metal dihalide in a vaporized state, the improvement comprising:

a buffer gas of from 5 to 15% nitrogen within said sealed enclosure; and means for adding said buffer gas of nitrogen into said sealed enclosure which is mixed with said helium buffer gas and added to said sealed enclosure prior to preionizing of said gases.

2. In an improved, pulsed, wavelength-tunable laser as claimed in claim 1; the improvement in which:

said added nitrogen gas is 10% of the total buffer gas for optimum output operation.

3. In an improved, pulsed, wavelength-tunable laser as claimed in claim 1, the improvement wherein:

said heat source is operative to heat said laser cell to a temperature of from 135° C. to 180° C.

4. In an improved, pulsed wavelength-tunable laser as claimed in claim 3, the improvement which includes:

a high-voltage supply for preionizing said gaseous mixture; and a separate main voltage source for exciting the preionized gaseous mixture.

5. In an improved, pulsed, wavelength-tunable laser as claimed in claim 1 the improvement in which:

said enclosure contains mercuric halide vapor at a partial pressure of 1-10 Torr.

6. In an improved, pulsed, wavelength-tunable laser as claimed in claim 1, the improvement in which:

said enclosure contains mercuric halide vapor at a partial pressure of from 1-10 Torr to which said nitrogen gas and said helium gas are added prior to preionization with a final total pressure of about 1000 Torr.

7. In an improved, pulsed, wavelength-tunable laser as claimed in claim 2, the improvement wherein:

said enclosure contains mercuric halide vapor at a partial pressure of from 1-10 Torr to which said nitrogen gas and said helium gas are added prior to preionization with the gases having a final total pressure of about 1000 Torr.

* * * * *